United States Patent
Katoh et al.

(10) Patent No.: US 12,539,743 B2
(45) Date of Patent: Feb. 3, 2026

(54) INFORMATION PROCESSING DEVICE, INFORMATION PROCESSING METHOD, AND SYSTEM

(71) Applicant: TOYOTA JIDOSHA KABUSHIKI KAISHA, Toyota (JP)

(72) Inventors: Tatsunori Katoh, Nagoya (JP); Hiroyasu Hadano, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 164 days.

(21) Appl. No.: 17/549,988

(22) Filed: Dec. 14, 2021

(65) Prior Publication Data

US 2022/0258574 A1    Aug. 18, 2022

(30) Foreign Application Priority Data

Feb. 12, 2021   (JP) .................. 2021-021123

(51) Int. Cl.
*B60J 1/17*   (2006.01)
*B60W 40/08*   (2012.01)
*G06V 20/59*   (2022.01)

(52) U.S. Cl.
CPC .............. *B60J 1/17* (2013.01); *B60W 40/08* (2013.01); *G06V 20/59* (2022.01)

(58) Field of Classification Search
CPC . B60J 1/17; B60W 40/08; G06V 20/59; E05F 15/70; E05F 15/73; H04L 67/025
See application file for complete search history.

(56) References Cited

U.S. PATENT DOCUMENTS

| | | | | |
|---|---|---|---|---|
| 6,243,022 | B1 * | 6/2001 | Furukawa | G07C 9/00182 340/13.31 |
| 7,667,578 | B2 * | 2/2010 | Watanabe | G07C 5/008 340/425.5 |
| 9,278,610 | B2 * | 3/2016 | Nania | B60J 7/06 |

(Continued)

FOREIGN PATENT DOCUMENTS

| | | |
|---|---|---|
| CN | 104340086 A | 2/2015 |
| CN | 104670123 A | 6/2015 |

(Continued)

OTHER PUBLICATIONS

"Ismail, N et al.; Child Presence Detection System and Technologies; Sep. 2019; SAE International Malaysia; Journal of the Society of Automotive Engineers Malaysia vol. 3, Issue 3, pp. 290-297" (Year: 2019).*

(Continued)

*Primary Examiner* — Ramya P Burgess
*Assistant Examiner* — Christopher R Cardimino
(74) *Attorney, Agent, or Firm* — Sughrue Mion, PLLC

(57) ABSTRACT

An information processing device includes a controlling portion configured to execute the followings: when a predetermined condition for opening or closing of a window of a vehicle is established, transmitting, to the vehicle, a command to start the opening or closing of the window; acquiring information to determine whether or not a person is present inside the vehicle during the opening or closing of the window; and in a case where it is determined that a person is present inside the vehicle, transmitting, to the vehicle, a command to stop the opening or closing of the window.

16 Claims, 13 Drawing Sheets

(56) References Cited

U.S. PATENT DOCUMENTS

| | | | |
|---|---|---|---|
| 9,752,370 B2 * | 9/2017 | Van Wiemeersch ... | B60K 35/80 |
| 10,351,102 B2 * | 7/2019 | Park .................... | G06V 20/593 |
| 10,846,960 B1 * | 11/2020 | Lemberger ............ | G06V 20/63 |
| 11,270,538 B2 * | 3/2022 | Joao .................... | G07C 9/00896 |
| 2006/0238316 A1 | 10/2006 | Taki et al. | |
| 2008/0312797 A1 | 12/2008 | Takehisa | |
| 2010/0250052 A1 * | 9/2010 | Ogino ..................... | B60R 1/29 |
| | | | 348/148 |
| 2015/0145658 A1 | 5/2015 | Ovenshire | |
| 2016/0031342 A1 * | 2/2016 | Camello .............. | B60N 2/0026 |
| | | | 701/45 |
| 2016/0176375 A1 * | 6/2016 | Bolton ................. | B60J 7/0573 |
| | | | 701/49 |
| 2017/0314317 A1 * | 11/2017 | Fischbein .............. | E05F 15/74 |
| 2021/0291786 A1 * | 9/2021 | Cisneros ............... | B60R 25/01 |
| 2022/0270379 A1 | 8/2022 | Hadano et al. | |

FOREIGN PATENT DOCUMENTS

| | | | | | |
|---|---|---|---|---|---|
| CN | 106150266 | A | | 11/2016 | |
| CN | 106567640 | A | | 4/2017 | |
| CN | 109927662 | A | | 6/2019 | |
| CN | 106846563 | B | * | 2/2020 | ........... G06F 3/0482 |
| CN | 111717136 | A | * | 9/2020 | ............ B60K 35/00 |
| JP | 2006-233499 | A | | 9/2006 | |
| JP | 2006-299635 | A | | 11/2006 | |
| JP | 2006-307592 | A | | 11/2006 | |
| JP | 2006-315462 | A | | 11/2006 | |
| JP | 2006-316434 | A | | 11/2006 | |
| JP | 2006-347389 | A | | 12/2006 | |
| JP | 2008-308135 | A | | 12/2008 | |
| JP | 2010-143347 | A | | 7/2010 | |
| JP | 2011-236709 | A | | 11/2011 | |
| JP | 4862278 | B2 | * | 1/2012 | |
| JP | 2013-62694 | A | | 4/2013 | |
| JP | 2013244914 | A | * | 12/2013 | |
| JP | 2014-109176 | A | | 6/2014 | |
| JP | 2014-237929 | A | | 12/2014 | |
| KR | 20110108655 | A | * | 10/2011 | .............. B60J 1/004 |
| KR | 10-2014-0073790 | A | | 6/2014 | |
| WO | WO-2017018724 | A1 | * | 2/2017 | .............. E05F 15/73 |
| WO | WO-2018072468 | A1 | * | 4/2018 | .............. E05F 15/77 |

OTHER PUBLICATIONS

"Lochau, M et al.; Model-based pairwise testing for feature interaction coverage in software product line engineering; Sep. 2011; Springer Science+Business Media, LLC" (Year: 2011).*

Communication dated Mar. 22, 2024 in United States Patent and Trademark Office in U.S. Appl. No. 17/675,483.

U.S. Appl. No. 17/675,483, filed Feb. 18, 2022.

United States Office Action dated Sep. 16, 2024 in U.S. Appl. No. 17/675,483.

GAC Trumpchi, "User Manual of GS4 Automatic Intelligent Technology Edition 2020", www.gacmotor.com, Dec. 31, 2020 with partial translation of OA issued to CN202210156543.7.

Advisory Action issued in US AppIn U.S. Appl. No. 17/675,483 dated Jan. 13, 2025.

Non-Final Office Action issued in U.S. Appl. No. 17/675,483 dated Mar. 4, 2025.

Final Office Action issued in U.S. Appl. No. 17/675,483 dated Jul. 18, 2025.

Communication dated Oct. 17, 2025 issued by the United States Patent and Trademark Office in U.S. Appl. No. 17/675,483.

* cited by examiner

INFORMATION PROCESSING DEVICE, INFORMATION PROCESSING METHOD, AND SYSTEM

CROSS-REFERENCE TO RELATED APPLICATION

This application claims priority to Japanese Patent Application No. 2021-021123 filed on Feb. 12, 2021, incorporated herein by reference in its entirety.

BACKGROUND

1. Technical Field

The present disclosure relates to an information processing device, an information processing method, and a system.

2. Description of Related Art

Such a technology has been known that, in a case where a state where a user with a key leaves a vehicle for a given period of time is detected and a state where a window of the vehicle is open is detected, the window of the vehicle is automatically closed (for example, Japanese Unexamined Patent Application Publication No. 2006-307592 (JP 2006-307592 A)).

SUMMARY

An object of this disclosure is to restrain a user from making contact with a window of a vehicle during opening or closing of the window at the time when the window is opened or closed by a remote operation.

One aspect of this disclosure is an information processing device including a controlling portion configured to execute the followings: when a predetermined condition for opening or closing of a window of a vehicle is established, transmitting, to the vehicle, a command to start the opening or closing of the window; acquiring information to determine whether or not a person is present inside the vehicle during the opening or closing of the window; and in a case where it is determined that a person is present inside the vehicle, transmitting, to the vehicle, a command to stop the opening or closing of the window.

Another aspect of this disclosure is an information processing method in which a computer executes the followings: when a predetermined condition for opening or closing of a window of a vehicle is established, transmitting, to the vehicle, a command to start the opening or closing of the window; acquiring information to determine whether or not a person is present inside the vehicle during the opening or closing of the window; and in a case where it is determined that a person is present inside the vehicle, transmitting, to the vehicle, a command to stop the opening or closing of the window.

Another aspect of this disclosure is a system including a vehicle and a server. The vehicle transmits, to the sever, information on a predetermined condition for opening or closing of a window of the vehicle is established. When the vehicle receives, from the server, a command to start the opening or closing of the window, the vehicle starts the opening or closing of the window. The vehicle transmits, to the server, information on whether or not a person is present inside the vehicle during the opening or closing of the window. When the vehicle receives, from the server, a command to stop the opening or closing of the window, the vehicle stops the opening or closing of the window. When the predetermined condition for the opening or closing of the window of the vehicle is established, the server transmits, to the vehicle, the command to stop the opening or closing of the window. The server acquires, from the vehicle, information to determine whether or not a person is present inside the vehicle during the opening or closing of the window. In a case where it is determined that a person is present inside the vehicle, the server transmits, to the vehicle, a command to stop the opening or closing of the window.

Further, another aspect of this disclosure is a program causing a computer to execute the information processing method or a storage medium in which the program is stored in a non-transitory manner.

With this disclosure, it is possible to restrain a user from making contact with a window of a vehicle during opening or closing of the window at the time when the window is opened or closed by a remote operation.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Figure 1:
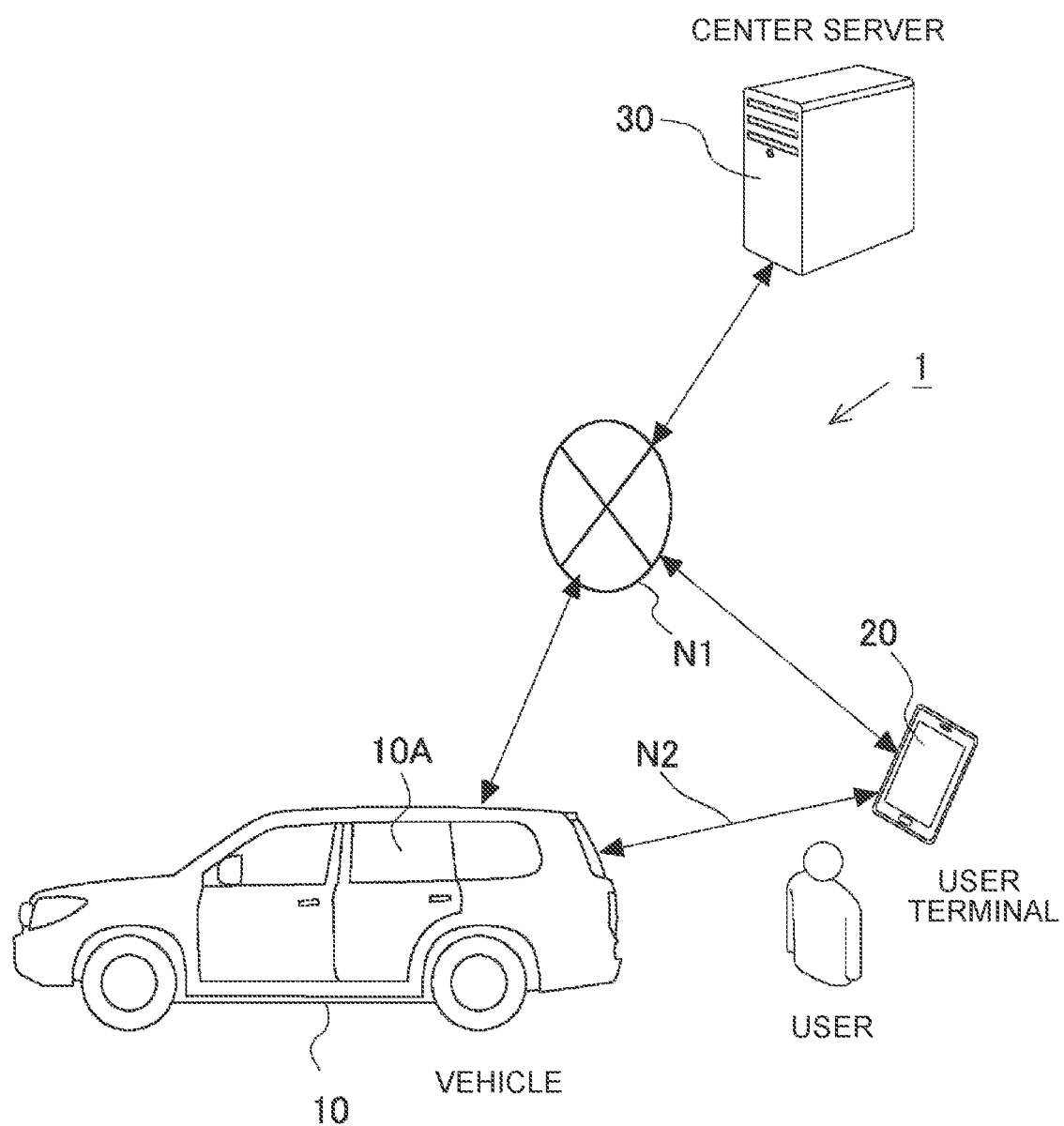
FIG. 1 is a view illustrating a schematic configuration of a system according to an embodiment.

An information processing device as one aspect of this disclosure includes a controlling portion. The controlling portion executes the followings. That is, when a predetermined condition for opening or closing of a window of a vehicle is established, the controlling portion transmits, to the vehicle, a command to start the opening or closing of the window. The controlling portion acquires information to determine whether or not a person is present inside the vehicle during the opening or closing of the window. In a case where the controlling portion determines that a person is present inside the vehicle, the controlling portion transmits, to the vehicle, a command to stop the opening or closing of the window.

The predetermined condition is a condition to start the opening or closing of the window of the vehicle. The predetermined condition is a condition based on which it is found that the vehicle is parked. For example, in a case where a state where a driver stops the function of the vehicle and leaves the vehicle is detected, the predetermined condition is determined to be established. In the meantime, after the opening or closing of the window is started, a state where a person is present inside the vehicle is one of the conditions to stop the opening or closing of the window. As such, the condition to start the opening or closing of the window may be different from the condition to stop the opening or closing of the window.

When the command to start the opening or closing of the window is transmitted to the vehicle, the opening or closing of the window is started in the vehicle. Here, in cases such as a case where the driver of the vehicle leaves the vehicle without noticing a person inside the vehicle, the predetermined condition may be established, so that the opening or closing of the window may be started. In this case, the person left inside the vehicle may make contact with the window. In view of this, the controlling portion determines whether or not a person is present inside the vehicle during the opening or closing of the window. This determination can be made by use of a detection value detected by a sensor configured to detect a dynamic body, the detection value being transmitted from the vehicle, for example. For example, in a case where a dynamic body is detected inside the vehicle, the controlling portion may determine that a person is present inside the vehicle. In a case where the controlling portion determines that a person is present inside the vehicle, the controlling portion transmits, to the vehicle, a command to stop the opening or closing of the window, so that the opening or closing of the window is stopped in the vehicle. Hereby, it is possible to restrain the person inside the vehicle from making contact with the window. Note that the window of the vehicle in this disclosure can include a sun roof.

The following describes embodiments of this disclosure with reference to the drawings. Configuration of the following embodiments are examples, and this disclosure is not limited to the configurations of the embodiments. Further, the following embodiments can be combined appropriately when possible.

First Embodiment

FIG. 1 is a view illustrating a schematic configuration of a system 1 according to the present embodiment. The system 1 is a system that can open and close a window 10A of a vehicle 10 by a remote operation. Opening or closing of the window 10A by a remote operation is executed when a predetermined condition is established. Here, in a case where the predetermined condition does not include a condition that a state where no person is present inside the vehicle 10 is detected by a sensor, even when the predetermined condition is established, a person may be present inside the vehicle 10. For example, a user may forget presence of a person inside the vehicle, and the user may park and leave the vehicle 10 in some cases. In such cases, when the opening or closing of the window 10A is performed by a remote operation, the person left inside the vehicle 10 may make contact with the window 10A that is being opened or closed.

In this respect, when a person is detected inside the vehicle 10 during the opening or closing the window 10A, a center server 30 stops the opening or closing of the window 10A. In a case where the center server 30 stops the opening or closing of the window 10A, the center server 30 notifies a user terminal 20 that the opening or closing of the window 10A is stopped or notifies the user terminal 20 that a person is present inside the vehicle 10.

In the example in FIG. 1, the system 1 includes the vehicle 10, the user terminal 20, and the center server 30. The user terminal 20 is a portable terminal possessed by the user. Further, the vehicle 10 is a vehicle associated with the user terminal 20. The vehicle 10, the user terminal 20, and the server 30 are connected to each other via a network N1. Note that the network N1 is a global public communication network such as the Internet, for example, and a wide area network (WAN) or other communication networks may be employed. Further, the network N1 may include a telecommunications network such as a mobile phone and a wireless communication network such as Wi-Fi (registered trademark). Further, the vehicle 10 is connected to the user terminal 20 via a network N2 including short-distance wireless communication or the like. In FIG. 1, one vehicle 10 is illustrated as an example, but a plurality of vehicles 10 can be present. Further, a plurality of users and a plurality of user terminals 20 can be present so as to correspond to the number of the vehicles 10.

Figure 2:
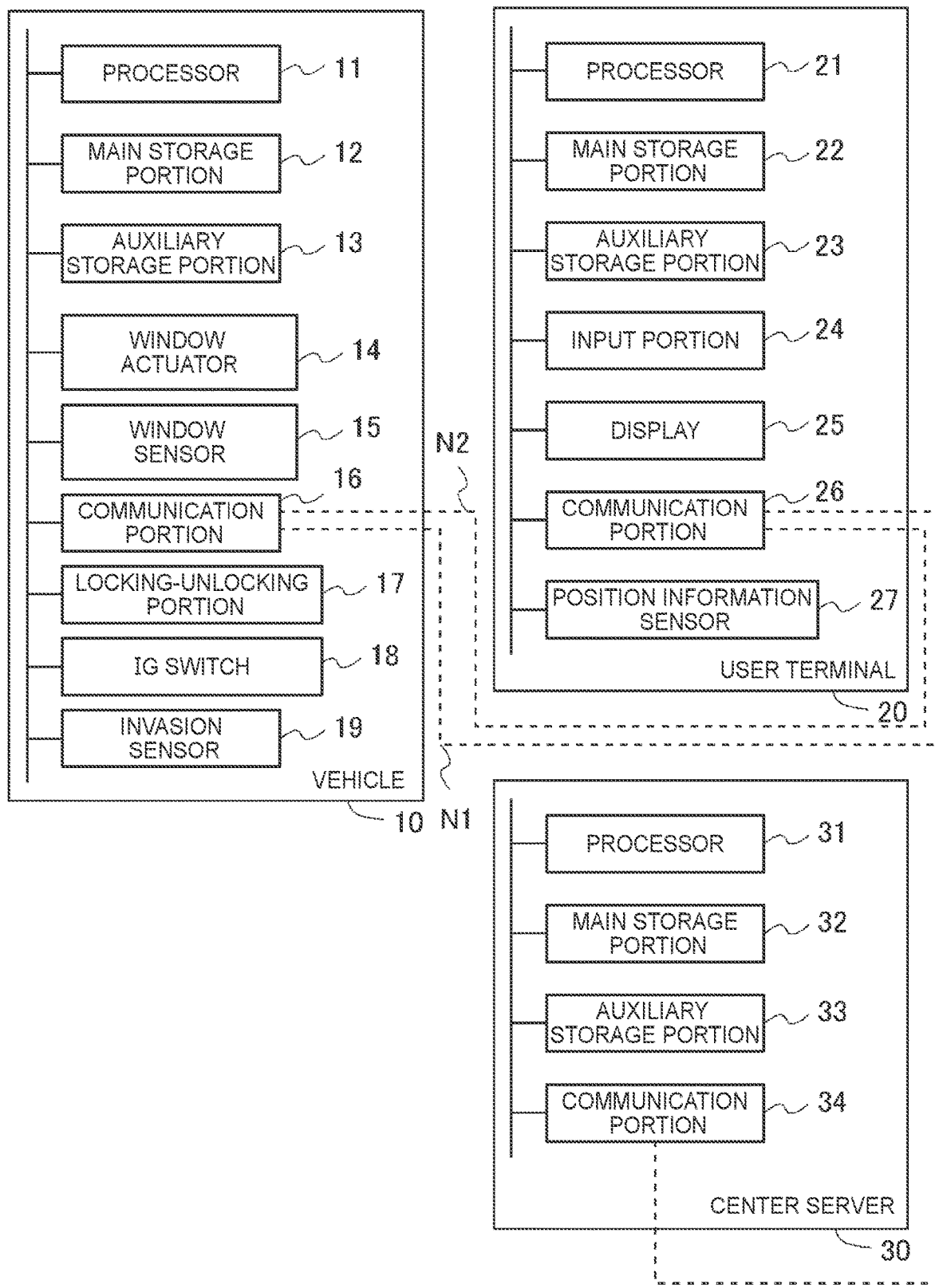
FIG. 2 is a block diagram diagrammatically illustrating examples of respective configurations of a vehicle, a user terminal, and a center server constituting the system according to the embodiment.

With reference to FIG. 2, hardware configurations and functional configurations of the vehicle 10, the user terminal 20, and the center server 30 will be described. FIG. 2 is a block diagram diagrammatically illustrating examples of respective configurations of the vehicle 10, the user terminal 20, and the center server 30 constituting the system 1 according to the present embodiment.

The center server 30 has a configuration of a general computer. The center server 30 includes a processor 31, a main storage portion 32, an auxiliary storage portion 33, and a communication portion 34. These portions are connected to each other via buses.

The processor 31 may be a central processing unit (CPU), a digital signal processor (DSP), or the like. The processor 31 controls the center server 30 and performs computing of various information processes. The main storage portion 32 is a random access memory (RAM), a read only memory (ROM), or the like. The auxiliary storage portion 33 is an erasable programmable ROM (EPROM), a hard disk drive (HDD), a removable medium, or the like. An operating system (OS), various programs, various tables, and the like are stored in the auxiliary storage portion 33. The processor 31 loads a program stored in the auxiliary storage portion 33 into a working area of the main storage portion 32 and executes the program, so that each constituent part or the like is controlled through the execution of the program. Hereby, the center server 30 implements a function corresponding to a predetermined purpose. The main storage portion 32 and the auxiliary storage portion 33 are recording media readable by a computer or the like. Note that the center server 30 may be a single computer or may be configured such that several computers cooperate with each other. Further, information stored in the auxiliary storage portion 33 may be stored in the main storage portion 32. Further, information stored in the main storage portion 32 may be stored in the auxiliary storage portion 33. Note that the processor 31 is one example of a controlling portion according to this disclosure.

The communication portion 34 is a unit configured to communicate with the vehicle 10 and the user terminal 20 via the network N1. The communication portion 34 is, for example, a local area network (LAN) interface board or a radio communications circuit for wireless communication. The LAN interface board or the radio communications circuit is connected to the network N1.

Note that a series of processes executed by the center server 30 can be executed by hardware or can be also executed by software.

Next will be described the user terminal 20. The user terminal 20 is a small computer such as a smartphone, a mobile phone, a tablet terminal, a personal information terminal, a wearable computer (a smart watch or the like), or a personal computer (PC). The user terminal 20 includes a processor 21, a main storage portion 22, an auxiliary storage portion 23, an input portion 24, a display 25, a communication portion 26, and a position information sensor 27. These portions are connected to each other via buses. The processor 21, the main storage portion 22, and the auxiliary storage portion 23 are configured similarly to the processor 31, the main storage portion 32, and the auxiliary storage portion 33 of the center server 30, so that their descriptions will be omitted herein.

The input portion 24 is a unit configured to receive an input operation performed by the user and is, for example, a touch panel, a mouse, a keyboard, a push button, or the like. The display 25 is a unit configured to exhibit information to the user and is, for example, a liquid crystal display (LCD), an electroluminescence (EL) panel, or the like. The input portion 24 and the display 25 may be configured as one touch panel display.

The communication portion 26 is a communication unit configured to connect the user terminal 20 to the network N1 or the network N2. The communication portion 26 is, for example, a circuit configured to perform communication with other devices (e.g., the vehicle 10, the center server 30, or the like) via the network N1 or the network N2 by use of a mobile communication service (e.g., a telecommunications network such as 5th generation (5G), 4th generation (4G), 3rd generation (3G), or long term evolution (LTE)) or a wireless communication network such as Wi-Fi (registered trademark) or Bluetooth (registered trademark).

The position information sensor 27 acquires position information (e.g., latitude and longitude) of the user terminal 20. The position information sensor 27 is, for example, a global positioning system (GPS) receiving portion, a wireless LAN communication portion, or the like.

Next will be described the vehicle 10. The vehicle 10 includes a processor 11, a main storage portion 12, an auxiliary storage portion 13, a window actuator 14, a window sensor 15, a communication portion 16, a locking-unlocking portion 17, an IG switch 18, and an invasion sensor 19. These portions are connected to each other via buses. The processor 11, the main storage portion 12, the auxiliary storage portion 13, and the communication portion 16 are configured similarly to the processor 21, the main storage portion 22, the auxiliary storage portion 23, and the communication portion 26 of the user terminal 20 so that their descriptions will be omitted herein.

The window actuator 14 is an actuator configured to open and close window glass and is typically an electric motor. The window sensor 15 is a sensor configured to detect the opening degree of the window glass. Note that the window sensor 15 may be a sensor configured to detect the opening degree of the window glass being a predetermined opening degree. For example, the window sensor 15 may be a sensor configured to detect whether a window is fully closed or not.

The locking-unlocking portion 17 locks and unlocks a door of the vehicle 10. The IG switch 18 is a switch to activate the vehicle 10 or stop the function of the vehicle 10 by the user pressing the IG switch 18. The invasion sensor 19 is a sensor configured to detect a person invading the vehicle 10 or a person being present inside the vehicle 10. The invasion sensor 19 is typically an infrared sensor, an image sensor, an ultrasonic sensor, a radar sensor, a vibration sensor, a microphone, or the like. The invasion sensor 19 can double as a sensor used for a security system. In this case, it is not necessary to provide the invasion sensor 19 separately.

Figure 3:
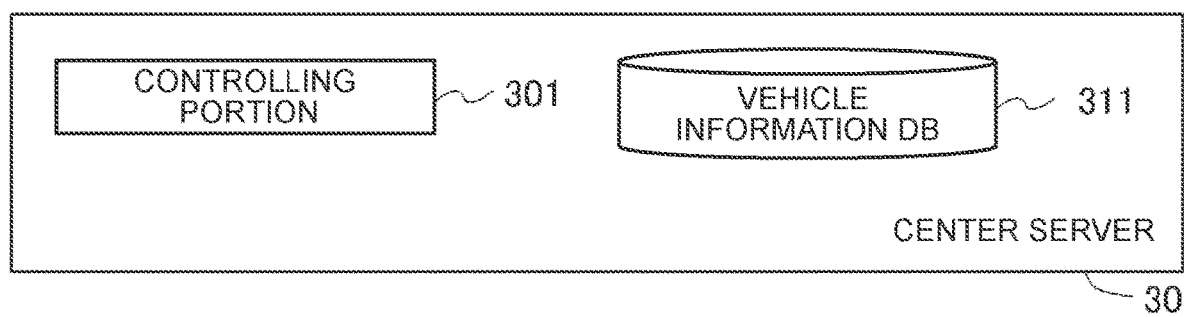
FIG. 3 is a view illustrating a functional configuration of the center server.

Next will be described the function of the center server 30. FIG. 3 is a view illustrating a functional configuration of the center server 30. The center server 30 includes a controlling portion 301 and a vehicle information DB 311 as functional constituents. The processor 31 of the center server 30 executes a process of the controlling portion 301 by a computer program in the main storage portion 32.

The vehicle information DB 311 is built such that a program of a database management system (DBMS) to be executed by the processor 31 manages data to be stored in the auxiliary storage portion 33. The vehicle information DB 311 is, for example, a relational database.

Note that the process of the controlling portion 301 may be partially executed by other computers connected to the network N1.

The controlling portion 301 acquires information on the vehicle 10 (hereinafter also referred to as vehicle information). The vehicle information is information for associating the vehicle 10 with the user terminal 20. In the vehicle information, a vehicle ID that is an identifier particular to the vehicle 10, a user ID that is an identifier particular to the user, and a user terminal ID that is an identifier particular to the user terminal 20 are stored. The user registers this information in the center server 30 in advance by use of the user terminal 20. When the controlling portion 301 acquires the vehicle information, the controlling portion 301 stores the vehicle information in the vehicle information DB 311.

When a predetermined condition is established, the controlling portion 301 opens or closes the window 10A of the vehicle 10 by a remote operation. For this purpose, the controlling portion 301 determines whether or not the predetermined condition is established. The predetermined condition is a condition to determine whether the vehicle 10 is parked or not. As an alternate method, the predetermined condition may be a condition to determine that the user is not in a state where the user drives the vehicle 10. In a case where the vehicle 10 is parked, the user cannot immediately open or close the window 10A of the vehicle 10. Accordingly, in a case where the user forgets to close the window 10A, for example, the window 10A remains open.

The predetermined condition is, for example, a state where the function of the vehicle 10 stops (the function is shut down) and a state where the user leaves the vehicle 10. When such a state is established, it can be said that the vehicle 10 is parked. The controlling portion 301 determines whether or not an electronic key 201A (described later) is present inside the vehicle 10, by use of the function of a smart key 101A (described later). When the electronic key 201A is not present inside the vehicle 10, it is considered that the user has got off the vehicle 10 with the electronic key 201A. Further, the controlling portion 301 acquires an activation state of the vehicle 10. That is, the controlling portion 301 acquires information on whether the vehicle 10 is shut down by the user pressing the IG switch 18. When the vehicle 10 is in a parking state, it is considered that the user does not drive the vehicle 10 immediately.

The controlling portion 301 determines whether or not the predetermined condition is established, based on the detection state of the electronic key 201A and the activation state of the vehicle 10 that are transmitted from the vehicle 10. That is, when the electronic key 201A is detected by the vehicle 10 and when the function of the vehicle 10 stops (the function is shut down), the controlling portion 301 determines that the predetermined condition is established. The detection state of the electronic key 201A and the activation state of the vehicle 10 may be transmitted from the vehicle 10 at predetermined intervals, or the detection state of the electronic key 201A and the activation state of the vehicle 10 may be transmitted when they are changed.

Note that, in the present embodiment, the controlling portion 301 determines whether or not the predetermined condition is established, based on the detection state of the electronic key 201A and the activation state of the vehicle 10. However, the predetermined condition is not limited to them. For example, instead of the detection state of the electronic key 201A, a door lock state may be taken as a condition. That is, when the door of the vehicle 10 is locked from outside the vehicle 10 and the vehicle 10 is shut down, the controlling portion 301 may determine that the predetermined condition is established. Further, for example, when the vehicle 10 is shut down and the door is opened and closed once, it is considered that a driver has got off the vehicle 10. Accordingly, the controlling portion 301 may determine that the predetermined condition is established.

Further, the controlling portion 301 determines whether or not the window 10A is open, based on a detection value detected by the window sensor 15 and transmitted from the vehicle 10. The detection value detected by the window sensor 15 may be transmitted at the same time as the detection state of the electronic key 201A, for example, or may be transmitted only once when the vehicle 10 is shut down (that is, when the IG switch 18 is pressed).

In a case where the predetermined condition is established and the window 10A is open, for example, the controlling portion 301 generates an inquiry about whether the window 10A is allowed to be closed or not, and the controlling portion 301 transmits it to the user terminal 20. In a case where the controlling portion 301 receives, from the user terminal 20, an answer that allows the window 10A to be closed, the controlling portion 301 generates a command to close the window 10A and transmits it to the vehicle 10. Note that, as an alternate method, opening or closing of the window 10A of the vehicle 10 may be performed regardless of a request from the user. In a case where the predetermined condition is established and the window 10A is open, for example, the window 10A may be closed. Further, the inquiry to the user is not also necessary. In a case where there is a request from the user who notices that the vehicle 10 is parked with the window 10A being opened and the predetermined condition is established, the controlling portion 301 may generate a command to close the window 10A and transmit it to the vehicle 10. Further, as an alternate method, in a case where the predetermined condition is established and the window 10A is open, for example, the controlling portion 301 may just notify the user terminal 20 that the window 10A is open. As a result, in a case where the user requests, from the user terminal 20, the controlling portion 301 to close the window 10A, the controlling portion 301 may generate a command to close the window 10A and transmit it to the vehicle 10.

Further, the controlling portion 301 receives a detection value detected by the invasion sensor 19 from the vehicle 10 after the controlling portion 301 transmits, to the vehicle 10, the command to close the window 10A. Then, the controlling portion 301 determines whether or not a person is present inside the vehicle 10, based on the detection value detected by the invasion sensor 19. In a case where the controlling portion 301 determines that a person is present inside the vehicle 10, the controlling portion 301 generates a command to stop opening or closing of the window 10A and transmits it to the vehicle 10. Further, the controlling portion 301 generates information indicating that the opening or closing of the window 10A is stopped, and the controlling portion 301 transmits it to the user terminal 20. The information may include information to notify the user that a person is present inside the vehicle 10.

Figure 4:
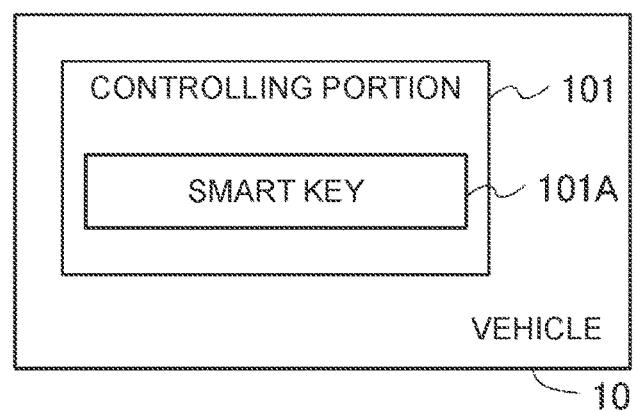
FIG. 4 is a view illustrating a functional configuration of the vehicle.

Next will be described the function of the vehicle 10. FIG. 4 is a view illustrating a functional configuration of the vehicle 10. The vehicle 10 includes a controlling portion 101 as a functional constituent. The processor 11 of the vehicle 10 executes a process of the controlling portion 101 by a computer program in the main storage portion 12. That is, the process of the controlling portion 101 may be partially executed by a hardware circuit.

The controlling portion 101 has a function of the smart key 101A to lock and unlock the door by operating the locking-unlocking portion 17 based on a signal from the user terminal 20. The controlling portion 101 performs short-distance wireless communication with the electronic key 201A (described later) by use of the function of the smart key 101A. For example, the controlling portion 101 transmits, to the center server 30 as the detection state of the electronic key 201A, information on whether or not the smart key 101A can communicate with the electronic key 201A, or information on the intensity of an electric wave from the electronic key 201A.

The controlling portion 101 transmits, to the center server 30 at predetermined intervals, the detection value detected by the window sensor 15, the detection state of the electronic key 201A, the detection value detected by the invasion sensor 19, and the activation state of the vehicle 10. Note that transmission of these pieces of information may be limited to information the detection value or the like of which has changed. Further, when the controlling portion 101 receives a command from the center server 30 via the communication portion 16, the controlling portion 101 executes a process corresponding to the command.

The detection value detected by the window sensor 15 is information on whether or not the window 10A is open, or information on the opening degree of the window 10A. The detection state of the electronic key 201A indicates a communication state between the smart key 101A and the electronic key 201A and is information based on which whether the user with the electronic key 201A is present inside the vehicle 10 or not can be determined. The detection value detected by the invasion sensor 19 is information based on which whether a person is present inside the vehicle 10 or not can be determined. The activation state of the vehicle 10 is information based on which whether the vehicle 10 is activated or the vehicle 10 stops its function can be determined. The activation state of the vehicle 10 is changed by the user pressing the IG switch 18, for example.

In a case where the controlling portion 101 receives, from the center server 30, a command to close the window 10A, the controlling portion 101 actuates the window actuator 14 and closes the window 10A. At this time, the window actuator 14 is actuated until the opening degree of the window 10A that is detected by the window sensor 15 is fully closed. Note that, as an alternate method, in a case where the controlling portion 101 receives, from the center server 30, a command to adjust the opening degree of the window 10A to a predetermined opening degree, the controlling portion 101 may actuate the window actuator 14 until the opening degree of the window 10A that is detected by the window sensor 15 becomes the predetermined opening degree.

Further, in a case where the controlling portion 101 actuates the window actuator 14 based on a command from the center server 30, the controlling portion 101 transmits, to the center server 30, the detection value detected by the invasion sensor 19. The detection value detected by the invasion sensor 19 may be transmitted to the center server 30 every predetermined time or may be transmitted to the center server 30 when the detection value has changed. In a case where the controlling portion 101 receives, from the center server 30, a command to stop opening or closing of the window 10A after the controlling portion 101 transmits, to the center server 30, the detection value detected by the invasion sensor 19, the controlling portion 101 stops the window actuator 14. In a case where the controlling portion 101 stops the window actuator 14, the controlling portion 101 may notify the center server 30 that the window actuator 14 is stopped.

Figure 5:
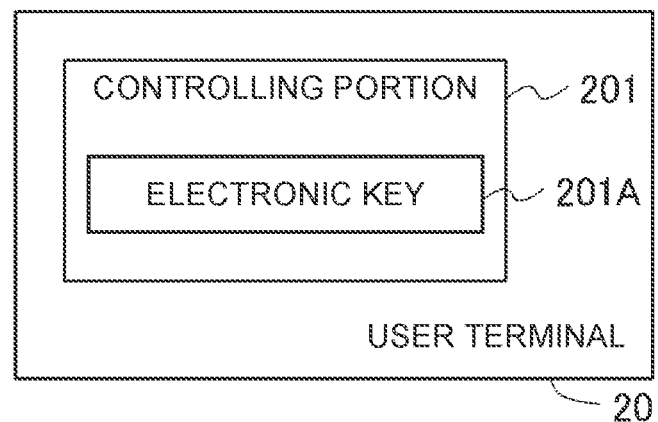
FIG. 5 is a view illustrating a functional configuration of the user terminal.

Next will be described the function of the user terminal 20. FIG. 5 is a view illustrating a functional configuration of the user terminal 20. The user terminal 20 includes a controlling portion 201 as a functional constituent. The processor 21 of the user terminal 20 executes a process of the controlling portion 201 by a computer program in the main storage portion 22. Note that the process of the user terminal 20 may be partially executed by a hardware circuit. The controlling portion 201 has the function of the electronic key 201A in a smart key system. Note that, as an alternate method, the user may possess a terminal having a function of an electronic key, separately from the user terminal 20. The controlling portion 201 (the electronic key 201A) establishes communication with the smart key 101A of the vehicle 10 and causes the smart key 101A to lock and unlock the vehicle 10.

Figure 6:
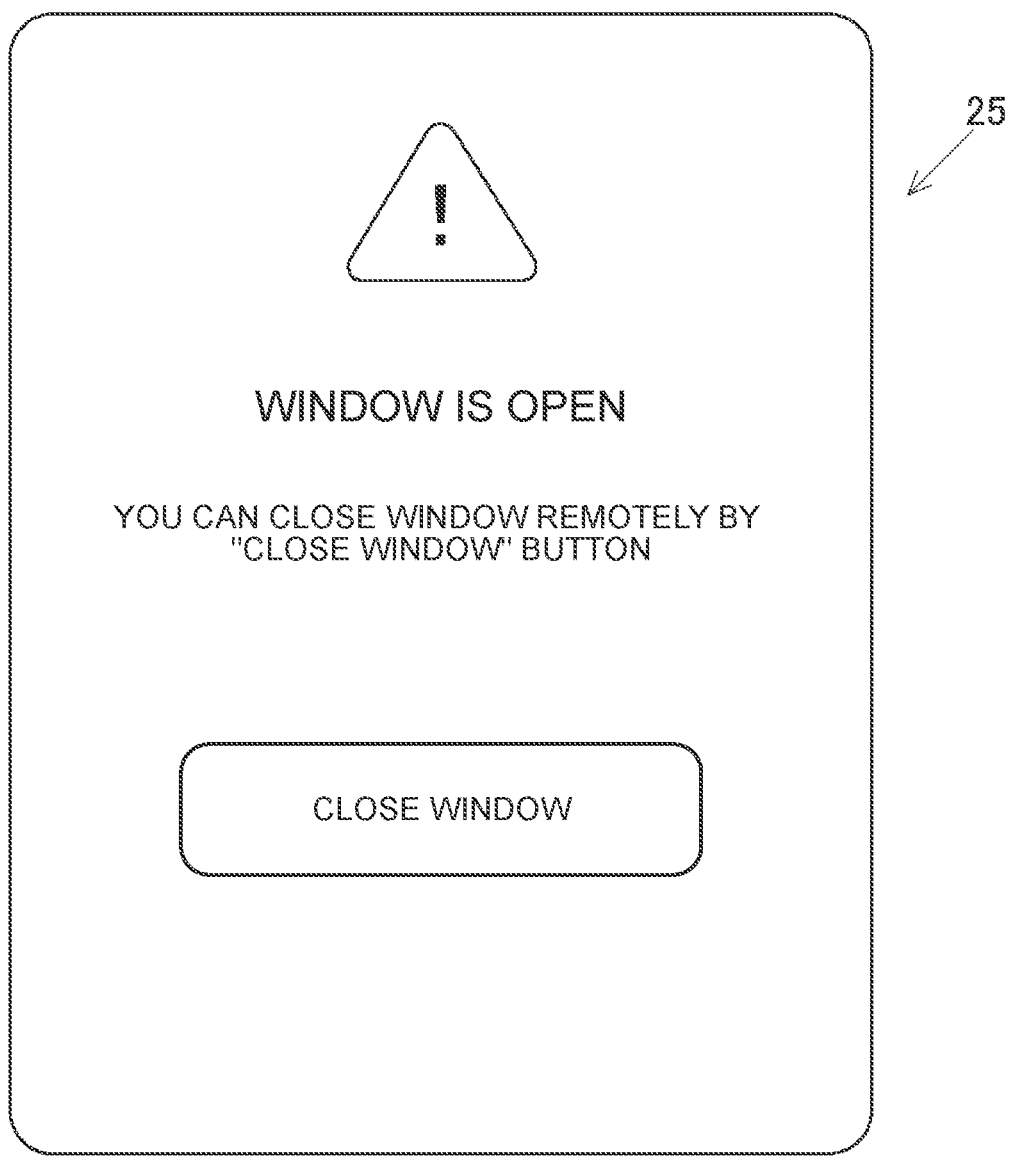
FIG. 6 illustrates an example of an image to be displayed on a display in response to an inquiry about whether a window is allowed to be closed or not.

Further, the controlling portion 201 receives an inquiry about opening or closing of the window 10A from the center server 30. For example, in a case where the window 10A is open, the controlling portion 201 receives an inquiry about whether the window 10A is allowed to be closed or not. When the controlling portion 201 receives this inquiry, the controlling portion 201 causes the display 25 to display content of the inquiry and words to promote the user to answer the inquiry. FIG. 6 illustrates an example of an image to be displayed on the display 25 in response to the inquiry about whether the window 10A is allowed to be closed or not. When the user presses a bouton "CLOSE WINDOW," the controlling portion 201 generates information to request closing of the window 10A and transmits it to the center server 30. Note that, in order to confirm whether the user who is operating the user terminal 20 is an authorized user or not, the controlling portion 201 may request the user to input a password or the like before the controlling portion 201 generates information to request closing of the window.

Figure 7:
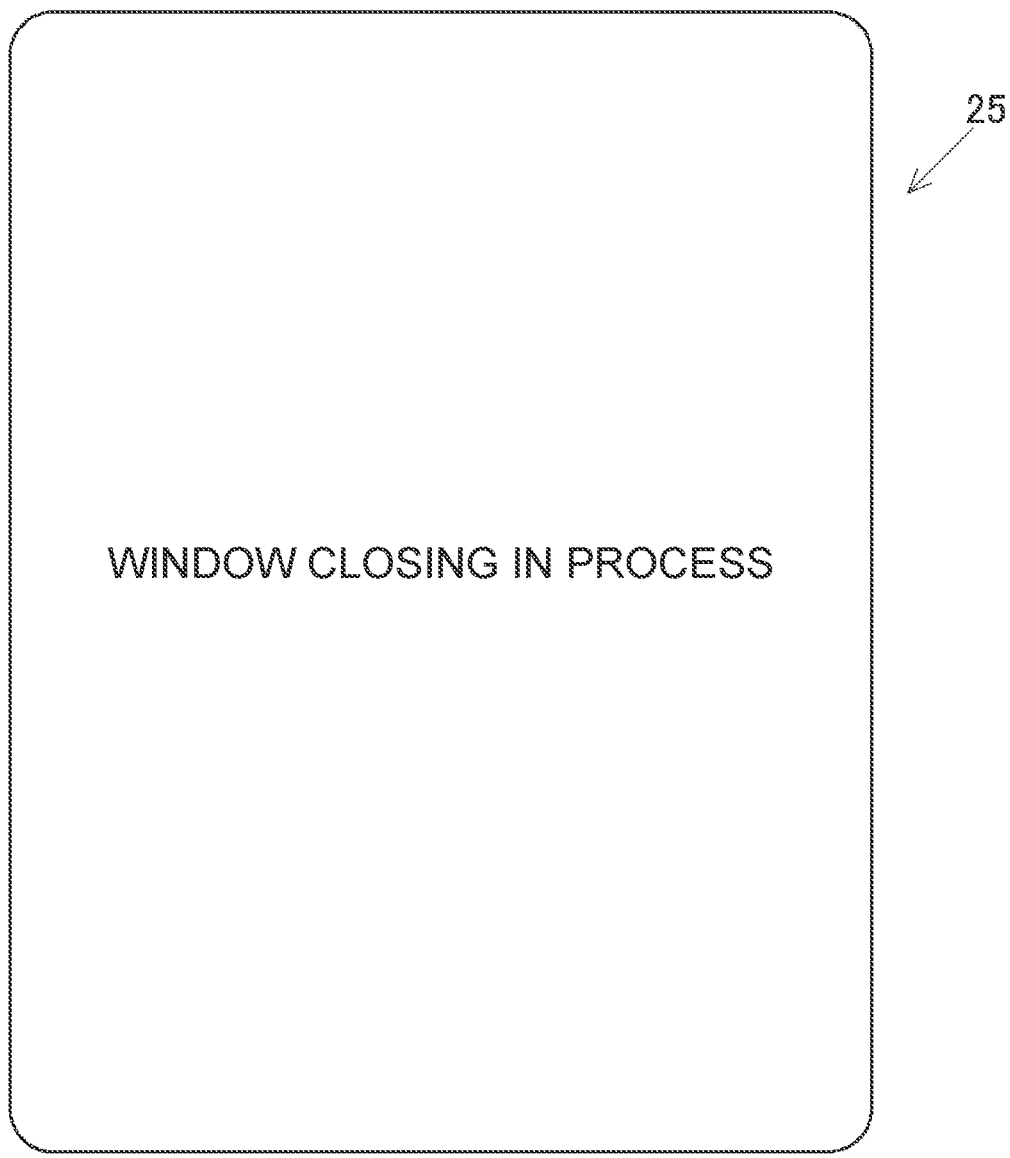
FIG. 7 is a view illustrating an example of an image to be displayed on the display by a controlling portion during closing of the window.
Figure 8:
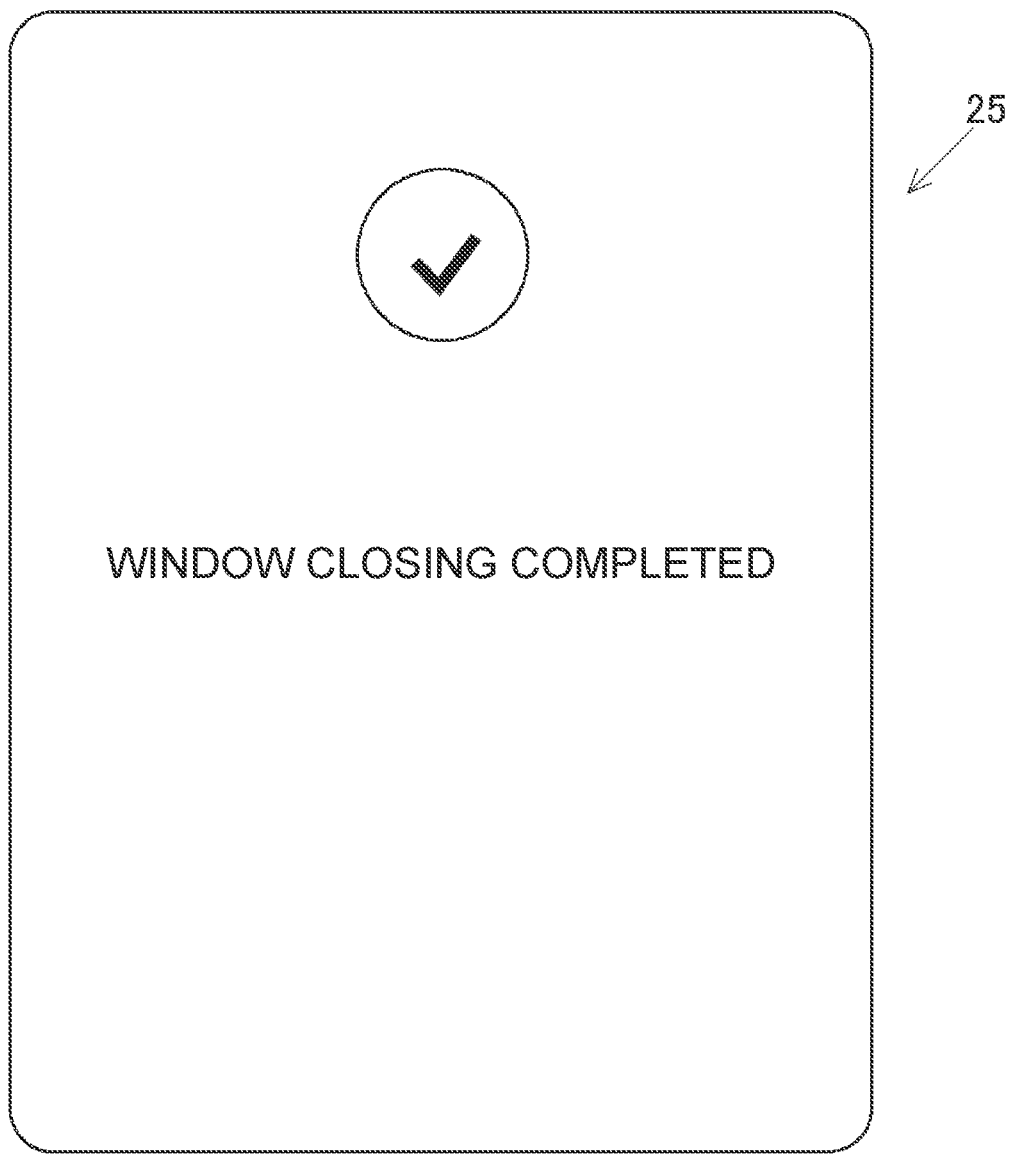
FIG. 8 is a view illustrating an example of an image to be displayed on the display by the controlling portion when the closing of the window is completed.
Figure 9:
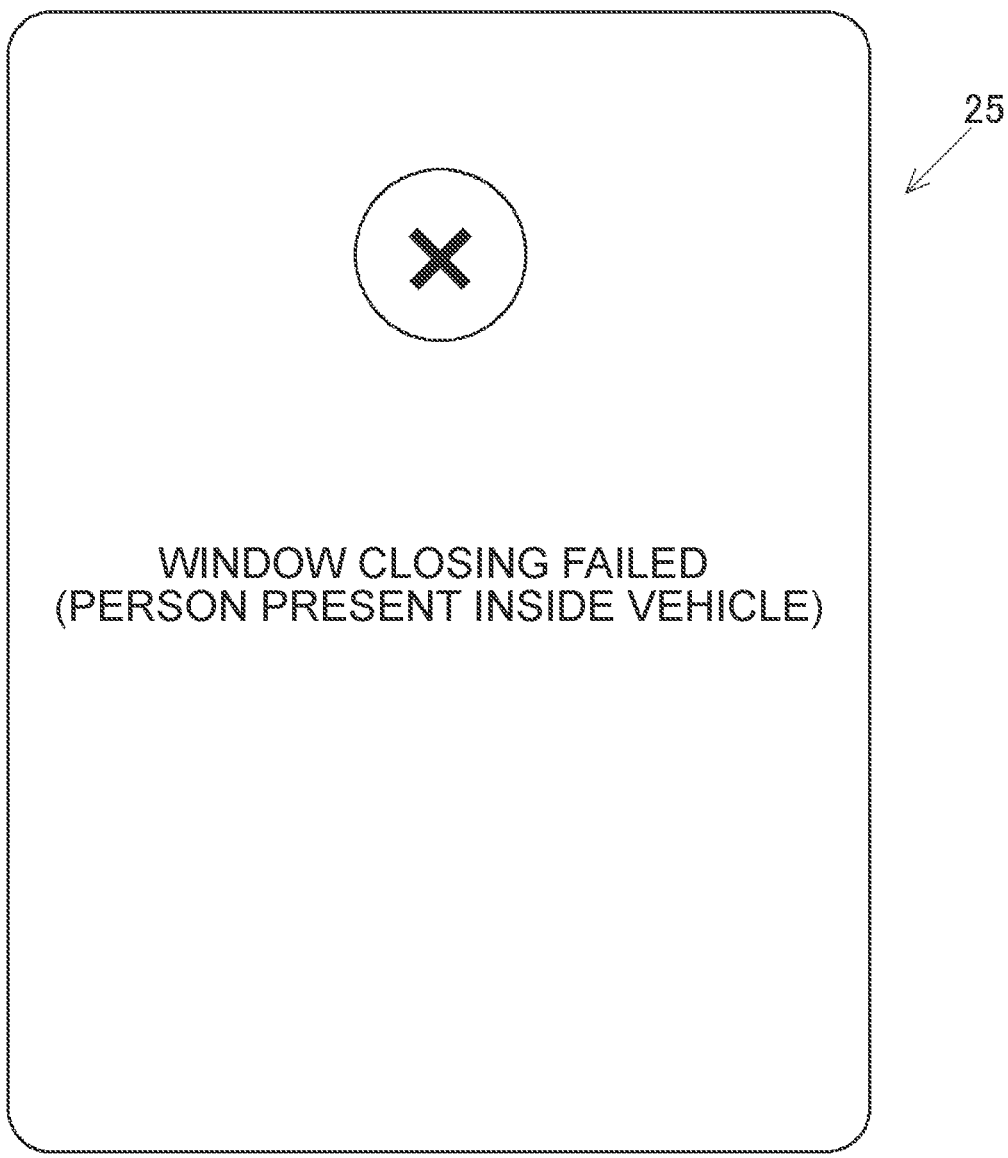
FIG. 9 is a view illustrating an example of an image to be displayed on the display by the controlling portion when the closing of the window has failed.

FIG. 7 is a view illustrating an example of an image to be displayed on the display 25 by the controlling portion 201 during closing of the window 10A. During the closing of the window 10A, the image illustrated in FIG. 7 is displayed on the display 25, so that the user can be notified that the window 10A is being closed. FIG. 8 is a view illustrating an example of an image to be displayed on the display 25 by the controlling portion 201 when the closing of the window 10A is completed. When the closing of the window 10A is completed, the image illustrated in FIG. 8 is displayed on the display 25, so that the user can be notified that the window 10A has been closed. In the meantime, FIG. 9 is a view illustrating an example of an image to be displayed on the display 25 by the controlling portion 201 when the closing of the window 10A has failed. In a case where the closing of the window 10A has failed, the image illustrated in FIG. 9 is displayed on the display 25, so that the user is notified that the closing of the window 10A has failed. The images illustrated in FIGS. 6, 7, 8, 9 are to be displayed on the display 25 by the controlling portion 201 based on a command from the center server 30.

Figure 10:
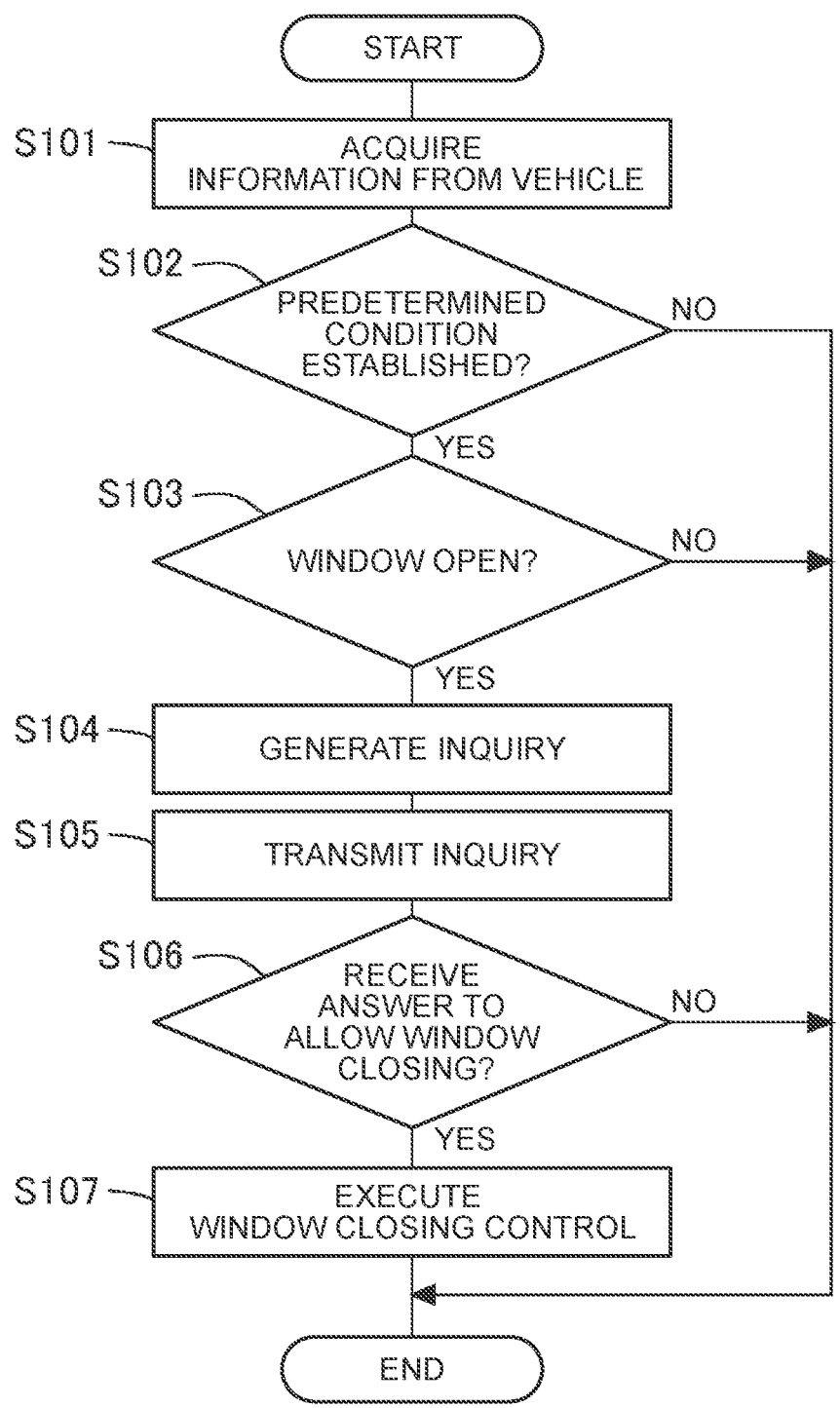
FIG. 10 is a flowchart of a process of the center server according to the embodiment.

Next will be described a process in the center server 30. FIG. 10 is a flowchart of the process of the center server 30 according to the present embodiment. The process illustrated in FIG. 10 is executed for each vehicle 10 in the center server 30 repeatedly every predetermined time. Note that the following description is made on the premise that necessary information is stored in the vehicle information DB 311. Further, the following description deals with a case where the window 10A is to be closed.

In step S101, the controlling portion 301 acquires information from the vehicle 10. The information to be acquired herein is information on a predetermined condition and information on the opening degree of the window 10A. In step S102, the controlling portion 301 determines whether the predetermined condition is established or not. For example, the controlling portion 301 determines whether the vehicle 10 is shut down and communication between the electronic key 201A and the smart key 101A is established or not. In a case where a positive determination is made in step S102, this routine proceeds to step S103, and in a case where a negative determination is made, the routine is ended.

In step S103, the controlling portion 301 determines whether the window 10A is open or not. The controlling portion 301 determines whether or not the detection value detected by the window sensor 15 and acquired from the vehicle 10 is a value indicating that the window 10A is open. In a case where a positive determination is made in step S103, this routine proceeds to step S104, and in a case where a negative determination is made, the routine is ended.

In step S104, the controlling portion 301 generates an inquiry to be transmitted to the user terminal 20. The inquiry is an inquiry about whether the window 10A is allowed to be closed or not. In step S105, the controlling portion 301 transmits the inquiry to the user terminal 20.

In step S106, the controlling portion 301 determines whether or not an answer to allow the window 10A to be closed is transmitted from the user terminal 20. In a case where the controlling portion 301 receives an answer to request closing of the window 10A from the user terminal 20, the controlling portion 301 determines that the answer to allow the window 10A to be closed is transmitted from the user terminal 20. In the meantime, in a case where the controlling portion 301 receives an answer not to request closing of the window 10A from the user terminal 20, or in a case where the controlling portion 301 does not receive any answer from the user terminal 20 even after a predetermined time, the controlling portion 301 determines that no answer to allow the window 10A to be closed is transmitted from the user terminal 20. In a case where a positive determination is made in step S106, this routine proceeds to step S107, and in a case where a negative determination is made, the routine is ended.

Figure 11:
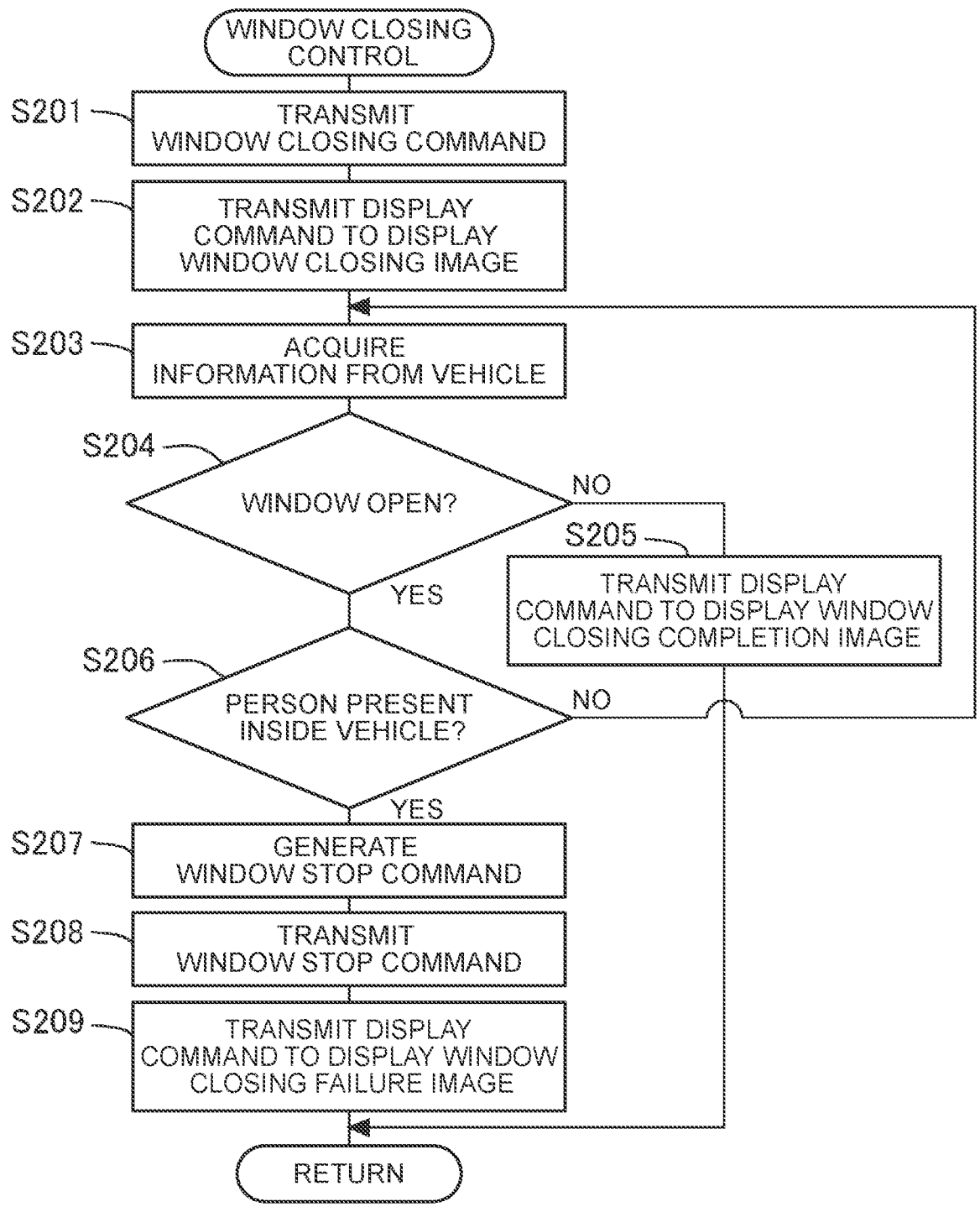
FIG. 11 is a flowchart of a window closing control.

In step S107, the controlling portion 301 executes a window closing control. The window closing control is a control to be executed at the time of closing the window 10A. Here, FIG. 11 is a flowchart of the window closing control. In step S201, the controlling portion 301 transmits a window closing command to the vehicle 10. The window closing command is a command to close the window 10A and is generated by the controlling portion 301.

In step S202, the controlling portion 301 transmits, to the user terminal 20, a command to display a window closing image on the display 25. The window closing image is an image illustrated in FIG. 7 and an image indicating that the window 10A is being closed.

In step S203, the controlling portion 301 acquires information from the vehicle 10. The information to be acquired herein includes the detection value detected by the window sensor 15 and the detection value of the invasion sensor 19. In step S204, the controlling portion 301 determines whether the window 10A is open or not. In a case where a positive determination is made in step S204, this routine proceeds to step S206, and in a case where a negative determination is made, the routine proceeds to step S205.

In step S205, the controlling portion 301 transmits, to the user terminal 20, a command to display a window closing completion image on the display 25. The window closing completion image is an image illustrated in FIG. 8 and an image indicating that the closing of the window 10A is completed. Note that the controlling portion 301 may transmit, to the user terminal 20, the command to display the window closing image on the display 25, after the controlling portion 301 receives window closing completion information (see step S307) (described later).

In step S206, the controlling portion 301 determines whether or not a person is present inside the vehicle 10. In a case where the detection value detected by the invasion sensor 19 is a value indicating that a person is present inside the vehicle 10, the controlling portion 301 determines that a person is inside the vehicle 10. In a case where a positive determination is made in step S206, this routine proceeds to step S207, and in a case where a negative determination is made, the routine proceeds to step S203.

In step S207, the controlling portion 301 generates a window stop command. The window stop command is a command to stop opening or closing of the window 10A of the vehicle 10. In step S208, the controlling portion 301 transmits the window stop command to the vehicle 10. Further, in step S209, the controlling portion 301 transmits, to the user terminal 20, a command to display a window closing failure image on the display 25. The window closing failure image is an image illustrated in FIG. 9 and an image indicating that the closing of the window 10A has failed. By transmitting this command, the user terminal 20 is notified that the closing of the window 10A has failed. Note that the controlling portion 301 may transmit, to the user terminal 20, the command to display the window closing failure image on the display 25, after the controlling portion 301 receives window closing stop information (described later) (see step S310). After that, this routine is ended. Hereby, the routine illustrated in FIG. 10 is also ended.

Figure 12:
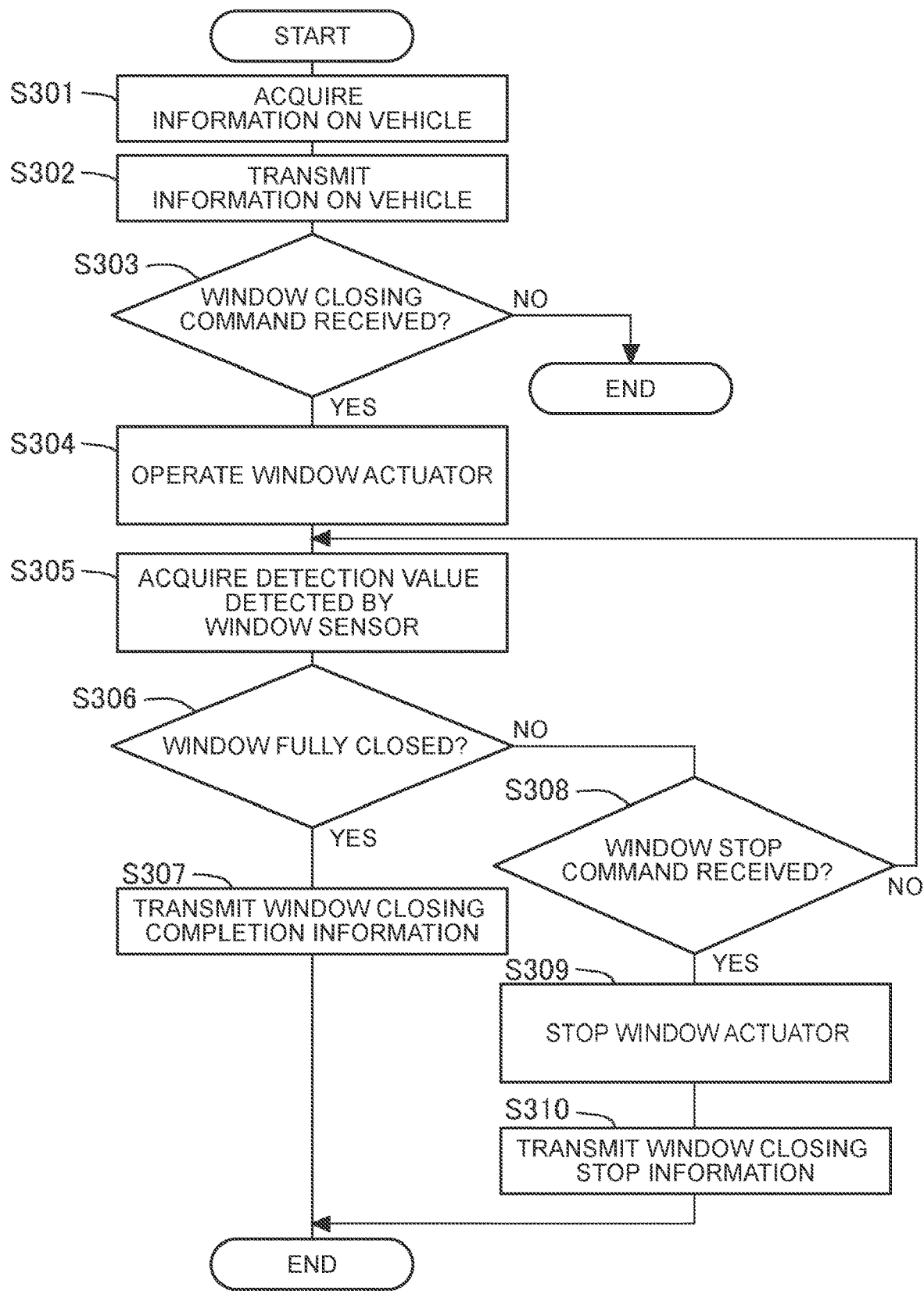
FIG. 12 is a flowchart of a process in the vehicle according to the embodiment.

Next will be described the process in the vehicle 10. FIG. 12 is a flowchart of the process of the vehicle 10 according to the present embodiment. The process illustrated in FIG. 12 is executed in the vehicle 10 repeatedly every predetermined time.

In step S301, the controlling portion 101 acquires information on the vehicle 10. The information to be acquired herein is information corresponding to the information received by the center server 30 in step S101. That is, the controlling portion 101 acquires the detection state of the electronic key 201A, the activation state of the vehicle 10, and the detection value detected by the window sensor 15. In step S302, the controlling portion 101 transmits the acquired information on the vehicle 10 to the center server 30. In step S303, the controlling portion 101 determines whether or not the controlling portion 101 receives a window closing command from the center server 30. The window closing command is transmitted from the center server 30 in step S201 in FIG. 11. In a case where a positive determination is made in step S303, this routine proceeds to step S304, and in a case where a negative determination is made, the routine is ended.

In step S304, the controlling portion 101 starts an operation of the window actuator 14 to close the window 10A. In step S305, the controlling portion 101 acquires the detection value detected by the window sensor 15. That is, the controlling portion 101 acquires the opening degree of the window 10A. In step S306, the controlling portion 101 determines whether or not the window 10A is fully closed, based on the detection value detected by the window sensor 15. That is, the controlling portion 101 determines whether or not the closing of the window 10A is completed. In a case where a positive determination is made in step S306, this routine proceeds to step S307, and in a case where a negative determination is made, the routine proceeds to step S308.

In step S307, the controlling portion 101 transmits window closing completion information to the center server 30. The window closing completion information is information indicating that the closing of the window 10A is completed. Note that the process of step S307 can be omitted. In the meantime, in step S308, the controlling portion 101 determines whether or not the controlling portion 101 receives a window stop command from the center server 30. The window stop command is transmitted from the center server 30 in step S208 in FIG. 11. In a case where a positive determination is made in step S308, this routine proceeds to step S309, and in a case where a negative determination is made, the routine returns to step S305.

In step S309, the controlling portion 101 stops the window actuator 14. In step S310, the controlling portion 101 transmits window closing stop information to the center server 30. The window closing stop information is information indicating that the closing of the window 10A is stopped. Note that the process of step S310 can be omitted.

Figure 13:
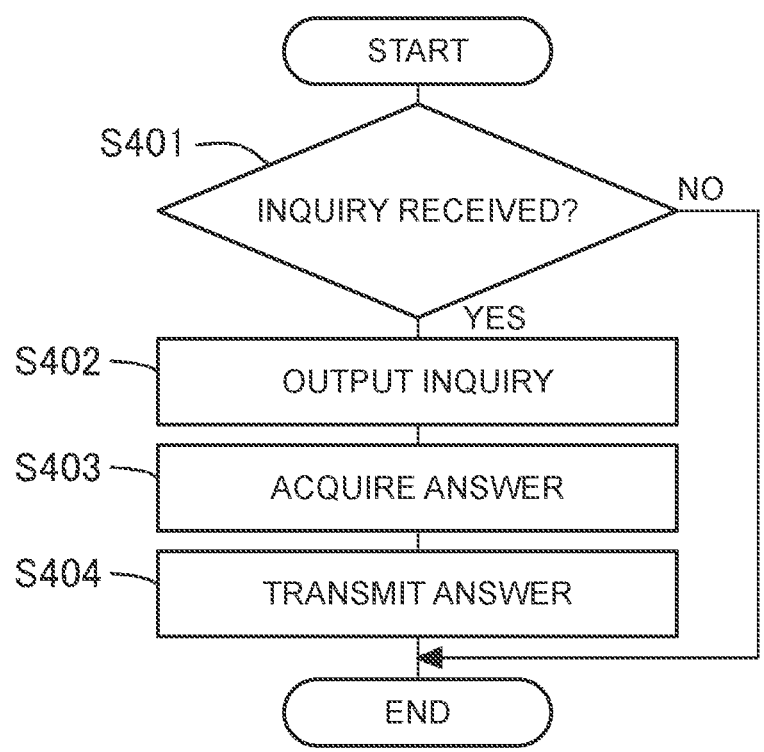
FIG. 13 is a flowchart of a first process in the user terminal according to the embodiment.

Next will be described a first process of the user terminal 20. FIG. 13 is a flowchart of the first process of the user terminal 20 according to the present embodiment. The first process is a process to answer an inquiry from the center server 30. The first process illustrated in FIG. 13 is executed in the user terminal 20 repeatedly every predetermined time.

In step S401, the controlling portion 201 determines whether or not the controlling portion 201 receives an inquiry from the center server 30. This inquiry is an inquiry about whether the window 10A is allowed to be closed or not and is an inquiry to be transmitted from the center server 30 in step S105 in FIG. 10. In a case where a positive determination is made in step S401, this routine proceeds to step S402, and when a negative determination is made, the routine is ended.

In step S402, the controlling portion 201 displays, on the display 25, an image corresponding to the inquiry about whether the window 10A is allowed to be closed or not. At this time, the image illustrated in FIG. 6 is displayed.

In step S403, the controlling portion 201 acquires an answer to the inquiry. In a case where the user presses a button "CLOSE WINDOW," the controlling portion 201 acquires an answer indicating that the user wants the window 10A to be closed. In the meantime, in a case where the user does not press the button "CLOSE WINDOW" for a predetermined time, the controlling portion 201 acquires an answer indicating that the user does not want the window 10A to be closed.

Then, in step S404, the controlling portion 201 transmits the answer acquired in step S403 to the center server 30.

Figure 14:
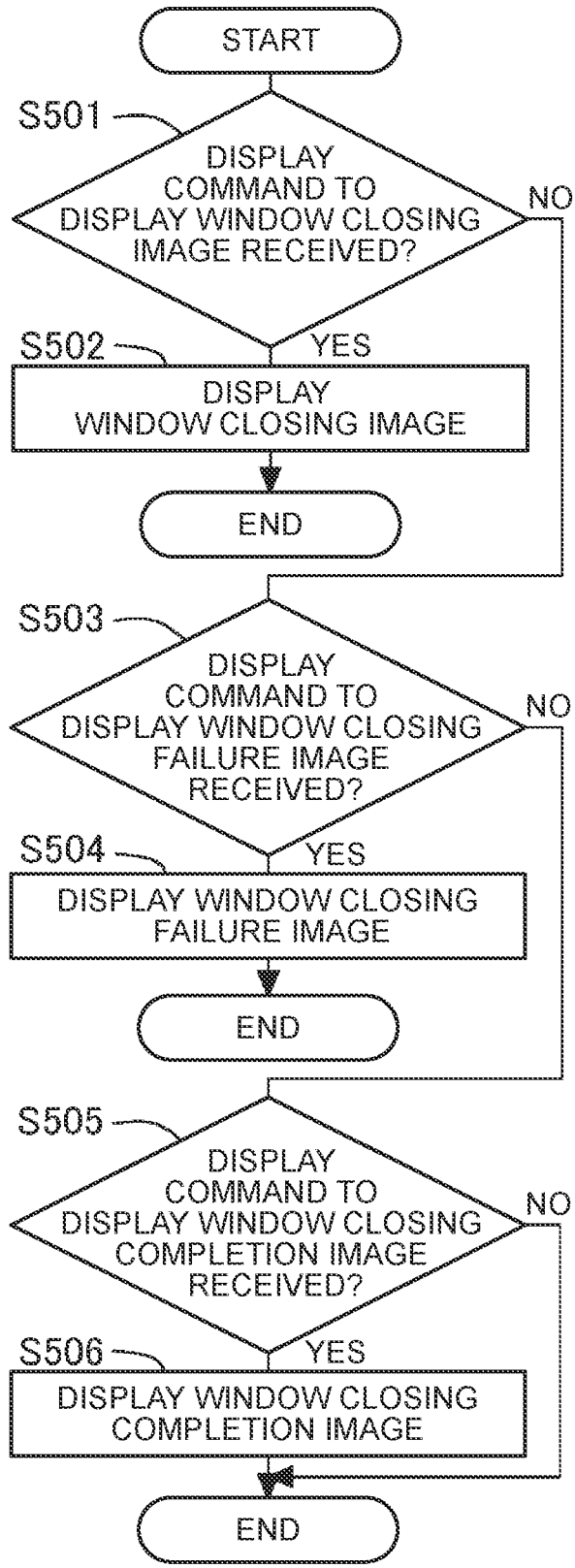
FIG. 14 is a flowchart of a second process in the user terminal according to the embodiment.

Next will be described a second process of the user terminal 20. FIG. 14 is a flowchart of the second process of the user terminal 20 according to the present embodiment. The second process is a process to notify the user of the state of the window 10A. The second process illustrated in FIG. 14 is executed in the user terminal 20 repeatedly every predetermined time.

In step S501, the controlling portion 201 determines whether or not the controlling portion 201 receives a display command to display a window closing image from the center server 30. The display command to display the window closing image is a command to be transmitted from the center server 30 in step S202 in FIG. 11. In a case where a positive determination is made in step S501, this routine proceeds to step S502, so that the controlling portion 201 causes the display 25 to display the window closing image. At this time, the image illustrated in FIG. 7 is displayed. In a case where a negative determination is made in step S501, this routine proceeds to step S503.

In step S503, the controlling portion 201 determines whether or not the controlling portion 201 receives a display command to display a window closing failure image from the center server 30. The display command to display the window closing failure image is a command to be transmitted from the center server 30 in step S209 in FIG. 11. In a case where a positive determination is made in step S503, this routine proceeds to step S504, so that the controlling portion 201 causes the display 25 to display the window closing failure image. At this time, the image illustrated in FIG. 9 is displayed. In a case where a negative determination is made in step S503, this routine proceeds to step S505.

In step S505, the controlling portion 201 determines whether or not the controlling portion 201 receives a display command to display a window closing completion image from the center server 30. The display command to display the window closing completion image is a command to be transmitted from the center server 30 in step S205 in FIG. 11. In a case where a positive determination is made in step S505, this routine proceeds to step S506, so that the controlling portion 201 causes the display 25 to display the window closing completion image. At this time, the image illustrated in FIG. 8 is displayed. In a case where a negative determination is made in step S505, or in a case where the process of step S506 is ended, this routine is ended.

As described above, in the present embodiment, in a case where a person is detected inside the vehicle 10 during opening or closing of the window 10A of the vehicle 10 by a remote operation, the opening or closing of the window 10A is stopped, so that it is possible to restrain the person from making contact with the window 10A thus being opened or closed.

OTHER EMBODIMENTS

The above embodiment is just one example, and this disclosure can be carried out with various modifications within a range that does not deviate from the gist of the disclosure.

The processes and the means described in this disclosure can be combined freely as long as no technical inconsistency occurs.

Further, a process described as a process to be executed by one device may be divided and executed by a plurality of devices. Alternatively, a process described as a process to be executed by different devices may be executed by one device. In a computer system, which hardware configuration (server configuration) is employed to implement each function is changeable flexibly. For example, the function of the center server 30 may be partially or fully included in the vehicle 10.

This disclosure can be achieved in such a manner that a computer program having the functions described in the above embodiment is supplied to a computer, and one or more processors provided in the computer reads and executes the program. Such a computer program may be provided to the computer by a non-transitory computer-readable storage medium connectable to a system bus of the computer or may be provided to a computer via a network. Examples of the non-transitory computer-readable medium include a disk of a given type such as a magnetic disk (a floppy (registered trademark) disk, a hard disk drive (HDD), or the like) or an optical disk (a CD-ROM, a DVD disc, a Blu-ray disc, or the like), a reading only memory (ROM), a random access memory (RAM), an EPROM, an EEPROM, a magnetic card, a flash memory, an optical card, a medium of a given type that is suitable to store an electronic order.

What is claimed is:

1. An information processing device comprising a controlling portion configured to execute the following:
   when a predetermined condition for opening or closing of a window of a vehicle is established, transmitting, to the vehicle, a command to start the opening or closing of the window and starting the opening or closing of the window;
   transmitting, to a user terminal associated with the vehicle, a command to cause a display of the user terminal to display information indicating that the window is opening or closing during the opening or closing of the window;
   acquiring information to determine whether or not a person is present inside the vehicle during the opening or closing of the window; and
   in a case where it is determined that a person is present inside the vehicle:
   transmitting, to the vehicle, a command to stop the opening or closing of the window, and stopping the opening or closing of the window, and
   transmitting, to the user terminal associated with the vehicle, a command to cause the user terminal to display information indicating that the opening or closing of the window has been stopped because of a presence of a person inside the vehicle,
   wherein the predetermined condition includes the vehicle being shut down and a door of the vehicle being opened and closed once.

2. The information processing device according to claim 1, wherein the controlling portion executes the following:
   receiving a detection value detected by a sensor configured to detect a dynamic body inside the vehicle, as the information to determine whether or not a person is present inside the vehicle; and determining whether or not a person is present inside the vehicle, based on the detection value detected by the sensor.

3. The information processing device according to claim 1, wherein, in a case where it is determined that a person is present inside the vehicle, the controlling portion transmits, to the user terminal associated with the vehicle, information indicating that a person is present inside the vehicle.

4. The information processing device according to claim 1, wherein, in a case where it is determined that a person is present inside the vehicle, the controlling portion transmits, to the user terminal associated with the vehicle, a command to cause the display of the user terminal to display information indicating that a person is present inside the vehicle.

5. The information processing device according to claim 1, wherein the predetermined condition is different from a condition to determine that a person is present inside the vehicle.

6. The information processing device according to claim 1, wherein:
after the predetermined condition is established, the controlling portion transmits, to the user terminal associated with the vehicle, an inquiry about whether the window of the vehicle is allowed to be opened or closed; and
in a case where the controlling portion acquires, from the user terminal, an answer to request opening or closing of the window of the vehicle, the controlling portion transmits, to the vehicle, a command to start the opening or closing of the window.

7. An information processing method in which a computer executes the following:
when a predetermined condition for opening or closing of a window of a vehicle is established, transmitting, to the vehicle, a command to start the opening or closing of the window;
transmitting, to a user terminal associated with the vehicle, a command to cause a display of the user terminal to display information indicating that the window is opening or closing during the opening or closing of the window;
acquiring information to determine whether or not a person is present inside the vehicle during the opening or closing of the window; and
in a case where it is determined that a person is present inside the vehicle,
transmitting, to the vehicle, a command to stop the opening or closing of the window, and stopping the opening or closing of the window, and
transmitting, to the user terminal associated with the vehicle, a command to cause the user terminal to display information indicating that the opening or closing of the window has been stopped because of a presence of a person inside the vehicle,
wherein the predetermined condition includes the vehicle being shut down and a door of the vehicle being opened and closed once.

8. The information processing method according to claim 7, wherein the computer executes the following:
receiving a detection value detected by a sensor configured to detect a dynamic body inside the vehicle, as the information to determine whether or not a person is present inside the vehicle; and determining whether or not a person is present inside the vehicle, based on the detection value detected by the sensor.

9. The information processing method according to claim 7, wherein, in a case where it is determined that a person is present inside the vehicle, the computer transmits, to the user terminal associated with the vehicle, information indicating that a person is present inside the vehicle.

10. The information processing method according to claim 7, wherein, in a case where it is determined that a person is present inside the vehicle, the computer transmits, to the user terminal associated with the vehicle, a command to cause the display of the user terminal to display information indicating that a person is present inside the vehicle.

11. The information processing method according to claim 7, wherein the predetermined condition is different from a condition to determine that a person is present inside the vehicle.

12. The information processing method according to claim 7, wherein:
after the predetermined condition is established, the computer transmits, to the user terminal associated with the vehicle, an inquiry about whether the window of the vehicle is allowed to be opened or closed; and
in a case where the computer acquires, from the user terminal, an answer to request opening or closing of the window of the vehicle, the computer transmits, to the vehicle, a command to start the opening or closing of the window.

13. A system comprising a vehicle and a server, wherein:
the vehicle transmits, to the server, information on a predetermined condition for opening or closing of a window of the vehicle;
when the vehicle receives, from the server, a command to start the opening or closing of the window, the vehicle starts the opening or closing of the window;
the vehicle transmits, to a user terminal associated with the vehicle, a command to cause a display of the user terminal to display information indicating that the window is opening or closing during the opening or closing of the window;
the vehicle transmits, to the server, information on whether or not a person is present inside the vehicle during the opening or closing of the window;
when the vehicle receives, from the server, a command to stop the opening or closing of the window, the vehicle stops the opening or closing of the window;
when the predetermined condition for the opening or closing of the window of the vehicle is established, the server transmits, to the vehicle, the command to stop the opening or closing of the window;
the server acquires, from the vehicle, information to determine whether or not a person is present inside the vehicle during the opening or closing of the window; and
in a case where it is determined that a person is present inside the vehicle, the server transmits, to the vehicle, a command to stop the opening or closing of the window and the server transmits, to the user terminal associated with the vehicle, a command to cause the user terminal to display information indicating that the opening or closing of the window has been stopped because of a presence of a person inside the vehicle,
wherein the predetermined condition includes the vehicle being shut down and a door of the vehicle being opened and closed once.

14. The system according to claim 13, wherein:
the vehicle includes a sensor configured to detect a dynamic body inside the vehicle; and
the vehicle transmits, to the server, a detection value detected by the sensor as information to determine whether a person is present inside the vehicle or not.

15. The system according to claim 13, wherein, in a case where it is determined that a person is present inside the vehicle, the server transmits, to the user terminal associated with the vehicle, information indicating that a person is present inside the vehicle.

16. The system according to claim 13, wherein:
after the predetermined condition is established, the server transmits, to the user terminal associated with the vehicle, an inquiry about whether the window of the vehicle is allowed to be opened or closed; and
in a case where the server acquires, from the user terminal, an answer to request opening or closing of the window of the vehicle, the server transmits, to the vehicle, a command to start the opening or closing of the window.

\* \* \* \* \*